L. C. WEST.
MEDICATED NEST EGG.
APPLICATION FILED AUG. 20, 1913.
1,119,557.
Patented Dec. 1, 1914.
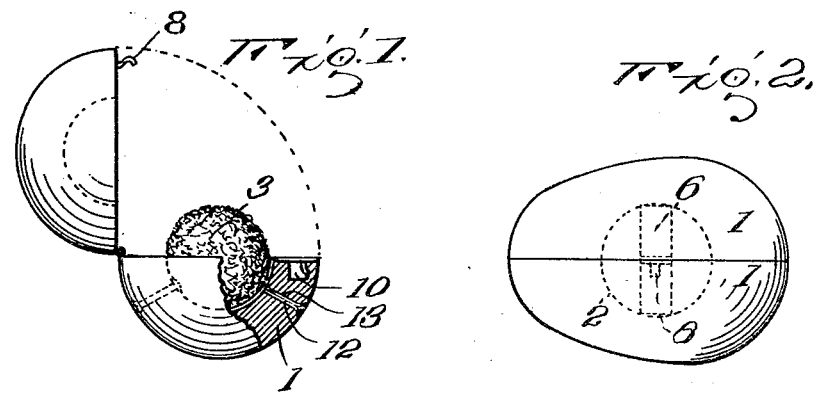
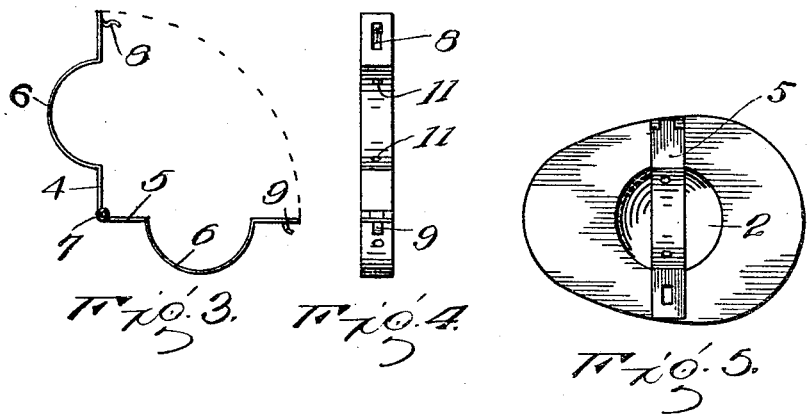
WITNESSES:
INVENTOR.
L. C. West
BY
ATTORNEYS

UNITED STATES PATENT OFFICE.

LENNER C. WEST, OF SENTINEL, OKLAHOMA.

MEDICATED NEST-EGG.

1,119,557.  Specification of Letters Patent.  Patented Dec. 1, 1914.

Application filed August 20, 1913. Serial No. 785,683.

*To all whom it may concern:*

Be it known that I, LENNER C. WEST, citizen of the United States, residing at Sentinel, in the county of Washita and State of Oklahoma, have invented certain new and useful Improvements in Medicated Nest-Eggs, of which the following is a specification.

This invention relates to medicated nest eggs and has as its object to provide a nest egg adapted to contain an insecticide or disinfectant, the egg being so constructed that there will be no likelihood of the medicament leaking from the egg although the fumes may have free exit so as to secure the desired results.

Another aim of the invention is to provide a nest egg of the class mentioned so constructed that its exterior surface will be free from projections which would be liable to annoy the fowls using the nest in which the egg is placed.

Another feature of the invention resides in so constructing the egg that it may be readily opened for the purpose of removing the insecticide or the filling saturated therewith, when its strength has become impaired so as to render it too weak to be effective.

In the accompanying drawings: Figure 1 is an end elevation of the egg embodying the present invention, the egg being illustrated partly in section and in open position; Fig. 2 is a side elevation of the egg closed and ready for use; Fig. 3 is a side elevation of the hinge frame for connecting the halves of the egg; Fig. 4 is a front elevation of the said frame; and Fig. 5 is a plan view of one of the halves of the egg illustrating also in plan the member of the frame which is secured thereto.

The egg embodying the present invention is formed in two halves or sections 1 which are of counterpart contour and each of which is substantially semielliptical, the egg as a whole being divided along its major axis as clearly shown in Figs. 2 and 5 of the drawings. The egg is preferably formed from fibrous material which is more or less porous so that fumes from the medicament whether an insecticide or disinfectant may penetrate the walls of the sections. Each half or section of the egg is formed centrally in its flat side with a depression or recess 2 which is designed to receive a filler 3 which is saturated with the medicament to be employed, this filler being preferably in the nature of a tuft or ball of cotton or other suitable material; or if the medicament is in powdered form it may be packed within the depressions 2.

The sections of the egg are connected by means of a hinge frame consisting of two sections one indicated by the numeral 4 and the other by the numeral 5. Each of the sections has its intermediate portion bent to substantially semicircular form as indicated at 6 and two of the end portions of the sections are hingedly connected as indicated at 7. The other or free end portion of the section 4 is provided with a stamped out latch tongue 8 and the corresponding end portion of the section 5 is stamped to form a keeper tongue 9 which projects into a recess 10 formed in the flat side of one of the halves 1 of the egg to which the sections 5 of the hinge frame is secured in a manner which will now be described.

In securing the members of the hinge frame to the sections or halves of the egg the intermediate portions 6 of the members are formed with openings 11 and double tongue staple fasteners 12 are fitted through these openings and through openings 13 which are formed radially in the sections of the egg, the ends of the tongues of each fastener being sprung apart as clearly shown in Fig. 1 of the drawings, whereby to secure the parts in their assembled relation.

By reference to Fig. 1 of the drawings it will be observed that when the sections of the egg are connected by the hinge frame the hinge joint 7 will be located at one side of the egg and the latch tongue 8 and keeper tongue 9 will be located at the other side of the egg. The frame members 4 and 5 are preferably of resilient metal and it will be understood that when the filler 3 has been placed within the depression 2 in one of the halves of the egg the halves may be closed or swung together so that the latch tongue 8 will spring into locking engagement with the keeper tongue 9. The egg is then ready for use and may be placed in the nest to be fumigated. When it becomes necessary to replace the filler 3 or to saturate the same with a fresh supply of the medicament the halves of the egg may be readily separated by gently pulling them apart at their free sides until the latch tongue disengages from the keeper tongue.

Having thus described the invention, what is claimed as new is:

1. A nest egg consisting of detachably connected mating fibrous sections having flat inner meeting faces and provided with registering recesses in said inner faces, and a fumigant-absorbing filler inclosed and supported by said recesses.

2. A nest egg consisting of mating sections having flat meeting inner faces provided with registering recesses, frame members extending transversely across the inner faces of the sections and having bowed portions fitting in the said recesses, said frame members being hinged together at one side of the mating sections and provided with fastening devices at the opposite side thereof, and an absorbent filler inclosed and supported by said registering recesses and the bowed portions of the frame members.

3. In a nest egg, sections provided with matching recesses to receive a medicament or the like, and means connecting the sections, said means comprising members carried one by each of the sections and each member consisting of a strip of material having end portions disposed against the flat side of the respective section of the egg and its intermediate portion formed to lie within the recess of the said section, securing elements passing through the said intermediate portion of each member and into the respective section, the end portions of the members at one side of the egg being hingedly connected and the end portions of the members at the other side of the egg being provided with coöperating latch and keeper elements for holding the sections closed.

In testimony whereof I affix my signature in presence of two witnesses.

LENNER C. WEST. [L. S.]

Witnesses:
G. C. SHIELDS,
S. T. TAYLOR.

Copies of this patent may be obtained for five cents each, by addressing the "Commissioner of Patents, Washington, D. C."